United States Patent [19]

Premji et al.

[11] Patent Number: 4,773,693

[45] Date of Patent: Sep. 27, 1988

[54] SEAT RELEASE MECHANISM

[75] Inventors: Gulam Premji, Willowdale; Peter J. Smith, Aurora, both of Canada

[73] Assignee: Canadian A.S.E. Limited, Downsview, Canada

[21] Appl. No.: 78,630

[22] Filed: Jul. 28, 1987

[30] Foreign Application Priority Data

Mar. 13, 1987 [CA] Canada .................................. 532070

[51] Int. Cl.[4] .......................... B60N 1/02; E05C 7/00
[52] U.S. Cl. ..................... 296/65.1; 292/11; 292/31; 292/DIG. 22; 297/379
[58] Field of Search .................. 296/65 R; 297/379; 292/11, 18, 31, DIG. 22

[56] References Cited

U.S. PATENT DOCUMENTS

| 88,950 | 3/1869 | Faber et al. | 248/503.1 |
|---|---|---|---|
| 328,178 | 10/1885 | Blakeslee | 248/503.1 |
| 330,876 | 11/1885 | Davis | 248/503.1 |
| 347,894 | 8/1886 | Simmons | 248/503.1 |
| 660,651 | 10/1900 | Olmsted | 248/503.1 |
| 1,052,150 | 2/1913 | Kindl | 248/503.1 |
| 1,510,969 | 10/1924 | Watrous | 296/65 R |
| 2,737,229 | 3/1956 | Semar | 155/14 |
| 3,188,126 | 6/1965 | Krause | 292/11 |
| 3,561,814 | 8/1969 | Klein | 296/65 R |
| 4,082,353 | 4/1978 | Hollowell | 297/379 |
| 4,103,964 | 8/1978 | Klingelhofer et al. | 297/367 |
| 4,252,369 | 2/1981 | Kluting | 297/379 |
| 4,294,488 | 10/1981 | Pickles | 297/379 X |
| 4,305,615 | 12/1981 | Osterhold | 297/379 |
| 4,365,838 | 12/1982 | Berg | 297/379 |
| 4,529,351 | 7/1985 | Olins | 292/31 X |
| 4,700,989 | 10/1987 | Ercilla | 296/65 R X |

Primary Examiner—Robert B. Reeves
Assistant Examiner—Russell D. Stormer
Attorney, Agent, or Firm—Patrick J. Hofbauer

[57] ABSTRACT

The invention relates to a latching assembly for releasably securing a vehicle seat to a vehicle body and is adapted to co-operate with two generally parallel spaced mounting bars rigidly affixed to a vehicle frame forming part of the vehicle body. The latching assembly comprises a bridge plate adapted for rigid attachment to the vehicle seat and dimensioned to span the distance separating a first and second of said two mounting bars. The bridge plate has a first connecting slot for releasable, securing engagement with the first mounting bar and a second connecting mechanism for releasable securing engagement with the second mounting bar. The first connecting means comprises an open-ended slot formed in the bridge plate and adapted for surrounding engagement with the first mounting bar so as to permit pivotal movement of the bridge plate and the attached vehicle seat about the first mounting bar. The second connecting mechanism comprises a pair of opposed movable jaw members pivotally mounted on the bridge plate for independent pivotal movement between a latchable configuration in which the jaw members are adapted to enclose the second mounting bar so as to restrain pivotal movement of the seat and an unlatchable configuration in which the jaw members are adapted to open from such enclosure so as to release the second mounting bar. The vehicle seat can thus pivot about the first mounting bar for subsequent removal only when the jaw members release the second mounting bar.

12 Claims, 3 Drawing Sheets

SEAT RELEASE MECHANISM

This invention relates to a latching assembly for releasably securing a vehicle seat to a vehicle body.

Vehicle seats have characteristically been designed as permanent fixtures in vehicles and so have generally not been adapted to be readily removed from a vehicle. Moreover, in the few instances where such removal has been provided for (typically in vans, or so called "multi-use" vehicles), the removal means have often been inefficient and awkward to operate, typically requiring, in the case of multiple passenger "bench" seats, more than one person for their successful operation. Additionally, to ensure that the stability of the vehicle seat relative to the vehicle body is not compromised, such prior art removal means have often been bulky and heavy, detracting from the aesthetic aspects of seat design and contributing to overall vehicle weight.

An object of this invention is to provide a vehicle seat latching assembly for releasably securing a vehicle seat to a vehicle body which is robust and which will not compromise the safety of passengers and yet will be simple to use, even by a single operator.

A further object is to provide a vehicle seat latching assembly for releasably securing a vehicle seat to a vehicle body which device is compact, simple and inexpensive to manufacture, relatively lightweight and which can be aesthetically incorporated into the seat assembly without undue intrusion into the passenger area.

A yet further object is to provide a seat latching assembly for releasably securing a vehicle seat to a vehicle body, which device optionally incorporates an inertial latch mechanism as a safety feature to prevent forward movement of the vehicle seat during sudden deceleration of a vehicle when the latching device is inadvertently left in an unlatched configuration.

The latching assembly of the invention is adapted to co-operate with two generally parallel spaced mounting bars rigidly affixed to a vehicle frame. The latching assembly comprises a bridge plate adapted for rigid attachment to the vehicle seat and dimensioned to span the distance separating a first and second of said two mounting bars. The bridge plate has a first connecting means for releasable, securing engagement with the first mounting bar and second connecting means for releasable securing engagement with the second mounting bar. The first connecting means comprises an open-ended slot formed in the bridge plate and adapted for surrounding engagement with the first mounting bar so as to permit pivotal movement of the bridge plate and the attached vehicle seat about said first mounting bar. The second connecting means comprises a pair of opposed movable jaw members pivotally mounted on the bridge plate for independent pivotal movement between a latchable configuration in which the jaw members are adapted to enclose the second mounting bar so as to restrain pivotal movement of the seat and an unlatchable configuration in which the jaw members are adapted to open from such enclosure so as to release the second mounting bar. The vehicle seat can thus pivot about the first mounting bar for subsequent removal only when the jaw members release the second mounting bar.

A preferred embodiment of the invention is described below, by way of example only, with reference to the following drawings, in which.

Figure 1:
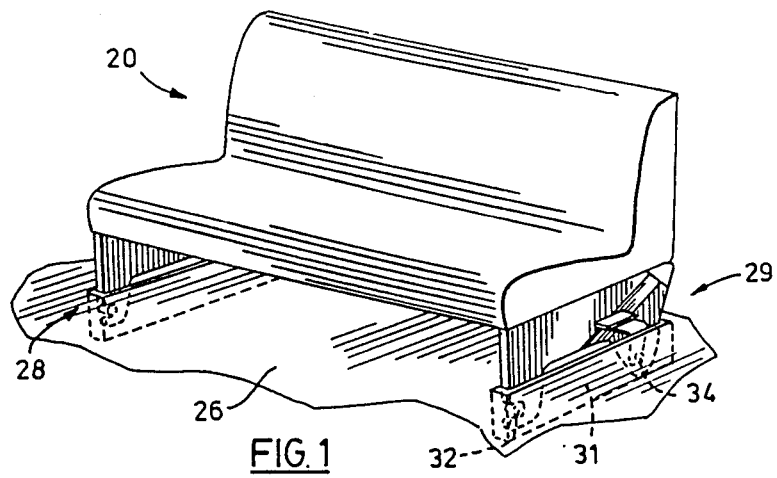
FIG. 1 is a perspective view illustrating a vehicle bench seat releasably secured to a vehicle frame by means of a pair of latching assemblies according to the invention located one each on opposite sides of a vehicle.
Figure 3:
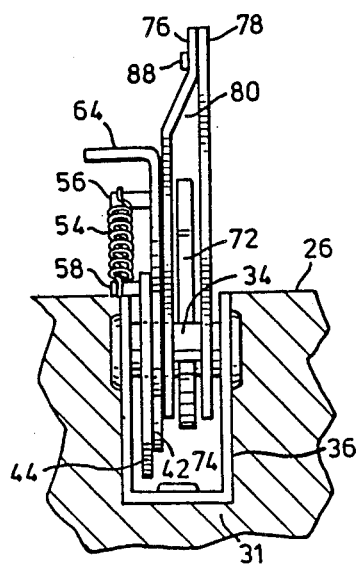
FIG. 3 is an elevational end view of the assembly of FIG. 2 taken in the direction of arrow 3.

In FIG. 1 a vehicle seat of the well-known "bench" type is generally indicated by the reference numeral 20. The vehicle seat 20 is releasably secured to the frame of a vehicle (not shown) by means of a pair of opposed latching assemblies, generally indicated by reference numerals 28 and 29, which assemblies are located under and rigidly affixed to opposite lateral ends of the vehicle seat 20. The latching assemblies 28 and 29 are mirror images of each other and function in a corresponding manner, so that, for ease of illustration, reference will be had in the following detailed description only to latching assembly 29 which appears on the right hand side of FIG. 1, it being expressly understood that assembly 28 and its associated structures are of corresponding construction.

In this description, the terms "forward", and "forwardly" mean towards the front of the vehicle, or, having reference to FIGS. 1,2 and 4–6, towards the left of these Figures. In the claims, these two terms mean towards the front of the vehicle in which the latching assembly of the invention is designed to be used. The terms "rearward" and "readwardly" have the corresponding opposite directional meanings, i.e., towards the rear of the vehicle, and to the right of FIGS. 1–2, and 4–6.

The latching assembly 29 is releasably secured to a generally trough-shaped structural element 31 of the vehicle frame which lies generally parallel to the longitudinal axis of the vehicle through the agency of first 32 and second 34 generally parallel, spaced mounting bars.

The mounting bars 32, 34 are rigidly affixed to side-walls 36 of the structural member 31 such that each spans the distance between the side-walls 36. For clarity, the first and second mounting bars are hereinafter referred to as the forward 32 and rearward 34 mounting bars respectively.

The structural member 31 is positioned so that the upper edges of the side walls 36 are generally flush with the upper surface of the vehicle floor pan 26, any may, as in the case of unit-body vehicles, be integrally formed with the floor pan 26. In this manner, the bulk of the latching assembly 29 is positioned between the side-walls 36 of the structural member 31 below the surface of the vehicle floor pan 26, so as not to intrude into the passenger area of the vehicle.

The latching assembly 29 comprises a bridge plate 38 adapted for rigid attachment by rivets or other conventional affixation means (not shown) to the vehicle seat 20 and is dimensioned to span the distance separating the forward mounting bar 32 from the rearward mounting bar 34.

At its forward end, the bridge plate 38 has a first connecting means, generally designated 33, for releasable securing engagement with the forward mounting bar 32. The first connecting means 33 is hereinafter referred to as the forward connecting means and comprises an open-ended slot 40 formed in a forward edge of the bridge plate 38 such that the forward mounting bar 32 may be partially surrounded by the forward connecting means 33. In this manner, the open-ended slot 40 is adapted for surrounding engagement with the forward mounting bar 32 so as to permit pivotal movement of the bridge plate 38 and the attached vehicle seat 20 about the forward mounting bar 32.

It will be obvious that this arrangement of the forward connecting means 33, in conjunction with a second connecting means discussed below, prevents forward and upward movement of the attached vehicle seat 20, particularly in conditions of sudden vehicle deceleration, such as occurs in an emergency stop, while at the same time allowing for the aforementioned pivotal movement of the vehicle seat 20 and its subsequent removal from the vehicle.

The bridge plate 38 also supports said second connecting means, hereinafter referred to as the rearward connecting means and generally indicated by reference numeral 41. This rearward connecting means is comprised of first 42 and second 44 opposed movable jaw members. The first 42 and second 44 jaw members are pivotally mounted on the bridge plate 38 by means of respective first 50 and second 52 pivot pins for pivotal movement independent of one another between a latchable configuration in which the jaw members 42,44 are together adapted to enclose the rearward mounting bar 34 so as to restrain the aforementioned pivotal movement of the bridge plate 38, and, an unlatchable configuration in which the jaw members 42, 44 are adapted to release the rearward mounting bar 34, thus allowing said pivotal movement of the bridge plate 38 (and the attached vehicle seat 20), and subsequent removal of the vehicle seat 20, as will be described more fully below.

Figure 2:
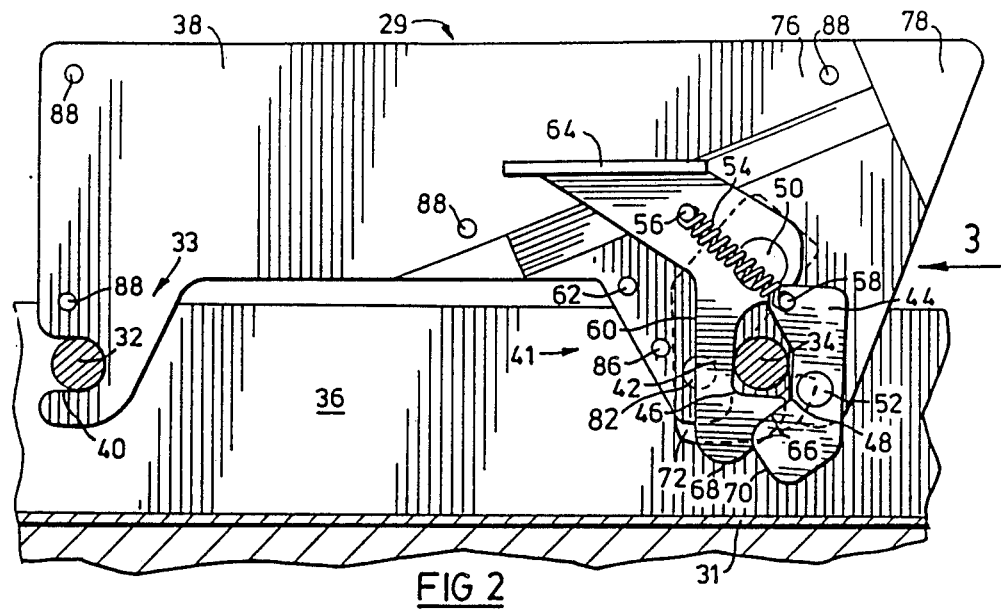
FIG. 2 is a side elevational view, partly in section, illustrating a latching assembly comprising forward and rearward connecting means according to the invention in latching co-operation with a forward and a rearward mounting bar fixed to the vehicle frame.

The first jaw member 42 has a rearwardly facing detent portion 46 while the second jaw member 44 has a forwardly facing detent portion 48 adapted to complement the detent portion 46 of the first jaw member 42 so as to enclose the rearward mounting bar 34, as shown in FIG. 2.

Figure 6:
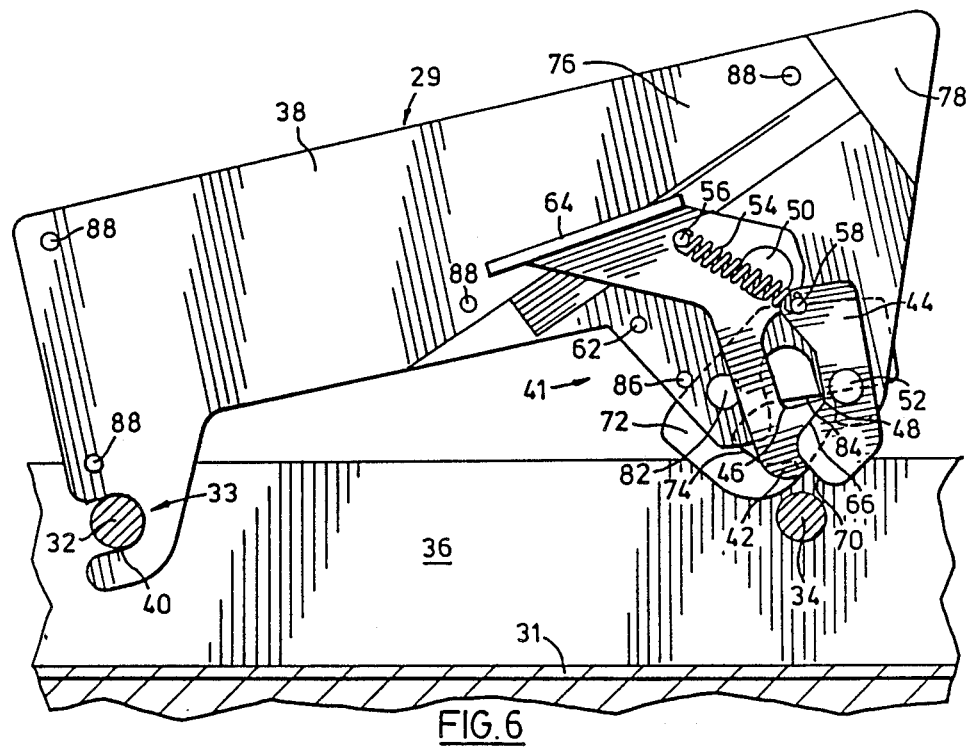
FIG. 6 is yet another view similar to FIG. 5 in which the rearward mounting bar has been released from the rearward connecting means and said rearward connecting means has assumed a latchable configuration.

A biasing means in the form of a coil spring 54 interconnects the first 42 and second 44 jaw members and is supported at one end by a first mounting pin 56 affixed to the first jaw member 42 and at the other end to a second mounting pin 58 affixed to the second jaw member 44. In FIGS. 2 and 6, the coil spring 54 lies below the longitudinal axis of the first pivot pin 50 of the first jaw member 42 and in such position biases the first jaw member 42 towards a latchable configuration of the jaw members 42, 44 in which the jaw members 42, 44 are adapted to enclose the rearward mounting bar 34.

In this specification and the appended claims, the term "above" means towards the top of the vehicle (as shown towards the top of FIG. 1-6) and the term "below" has the obvious opposite directional meaning.

Figure 4:
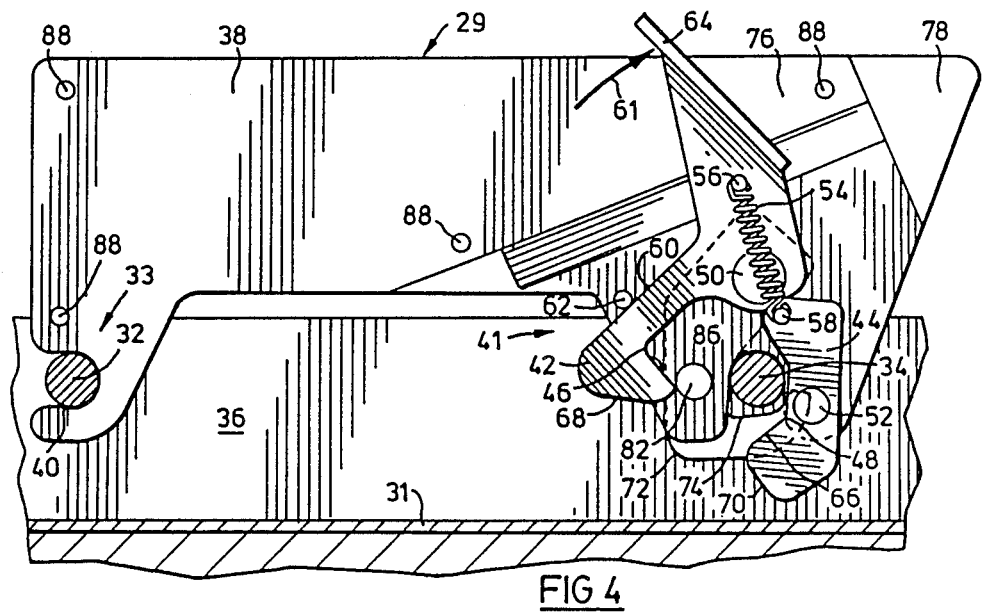
FIG. 4 is a view similar to FIG. 2 with a first jaw member of the rearward connecting means pivoted into a stable unlatched position so that the rearward connecting means assumes an unlatchable configuration.

FIG. 4 illustrates the first jaw member 42 in a stable unlatched position (which is merely one of the infinite number of positions the first jaw member 42 can assume in the unlatched configuration) in which position the coil spring 54 is brought above the axis of the first pivot pin 50. The first jaw member 42 will remain in the stable unlatched position until the coil spring 54 is returned below the axis of the first pivot pin 50, for example, by anti-clockwise pivoting of the first jaw member 42. The stable unlatched position is defined as the position where a forwardly facing portion 60 of the first jaw member 42, which portion 60 is opposite to the detent portion 46, is brought into engagement with a stop means comprising a stop pin or other protuberance 62 affixed to the bridge plate 38. The protuberence 62 lies in the path of pivotal movement of the first jaw member 42 so as to arrest such pivotal movement. The clockwise pivotal movement of the first jaw member 42 from the configuration of FIG. 2 to the stable unlatched configuration of FIG. 4 is facilitated by the provision of a user gripping handle 64 provided on the first jaw member 42 at an end remote from its detent portion 46, which handle 64 can be conveniently grasped by a user.

It will be appreciated that when the coil spring 54 is in the position illustrated in FIG. 4, i.e. above the axis of the first pivot pin 50, it will tend to bias the first jaw member 42 towards continued pivotal movement in the direction of the arrow 61, i.e., away from the rearward mounting bar 34. The first jaw member 42 thus remains in the stable unlatched position until it is positively displaced to a position in which the coil spring 54 lies below the longitudinal axis of the first pivot pin 50.

Figure 5:
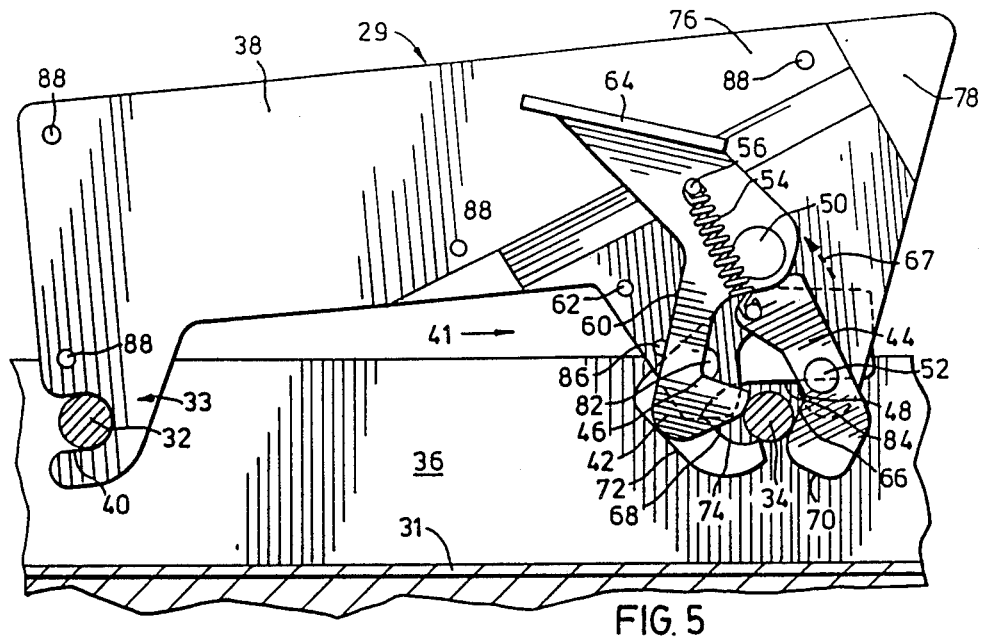
FIG. 5 is a view similar to FIG. 2 in which the vehicle seat has been pivoted upwardly about the forward mounting bar so as to partially move the rearward connecting means out of engagement with the rearward mounting bar.

Referring now more particularly to FIG. 5, it will be seen that an upward pivotal movement of the bench seat 20 about the forward mounting bar 32, with the first jaw member 42 in the stable unlatched position described above with reference to FIG. 4, causes a forwardly facing unlatching cam portion 66 adjacent the detent portion 48 of the second jaw member 44 to come into engagement with the rearward mounting bar 34. This in turn causes the second jaw member 44 to pivot about the second pivot pin 52 in a counterclockwise direction indicated by arrow 67 such that its detent portion 48 clears and releases the rearward mounting bar 34. Moreover, the upper end of the second jaw member 44 moves to the position illustrated in FIG. 5. This movement of the second jaw member 44 causes the coil spring 54 to return to a position lying below the longitudinal axis of the first pivot pin 50, such that the first jaw member 42 is destabilized and biased under urging of the coil spring 54 towards the latchable configuration illustrated in FIG. 6.

Return of the rearward connecting means 41 from the position illustrated and discussed above with reference to FIG. 6 towards an operative latched configuration, as illustrated in FIG. 2, is accomplished by pivoting the bench seat 20 downwardly about the forward mounting bar 32. Such a movement brings latching cam portions 68 and 70, positioned adjacent to the detent portion 46 of the first jaw member 42 and adjacent to the unlatching cam portion 66 of the second jaw member 44 respectively at the operatively downward ends of the jaw members, into engagement with the rearward mounting bar 34. Continued downward movement of the vehicle seat 20 cams the jaw members 42, 44 apart to thereby resume the configuration illustrated in FIG. 5 with the rearward mounting bar 34 located therebetween. Once the jaw members 42, 44 have cleared the rearward mounting bar 34, the jaw members freely pivot towards each other under urging of the coil spring 54 into the operative latched configuration of FIG. 2 in which the second mounting bar 34 is securely engaged between the detent portions 46, 48.

In the design of vehicle seat components, safety is always of paramount concern. It is conceivable that a vehicle operator intending to remove the vehicle seat 20 from the vehicle frame might through, for example, inadvertance, drive the vehicle with the first jaw member 42 in the stable unlatched position of FIG. 4. In such conditions, and in order to preclude accidental release of the vehicle seat 20 from the frame member 26 during sudden deceleration, the latching assembly 29 additionally includes an inertial latch member 72 pivotally mounted on the bridge plate 38 and having a detent portion 74 which is adapted to securingly engage the rearward mounting bar 34.

The bridge plate 38 is of bilaminar construction and is constructed to accommodate the inertial latch member 72 at its operatively rearward end between an operatively outer mounting plate 76 and an operatively inner mounting plate 78. The outer mounting plate 76 supports the first pivot pin 50, and the second pivot pin 52 for the first and second jaw members 42, 44 and also the first stop means 62. The outer mounting plate 76 is fastened to the inner mounting plate 78 at the operatively upper end thereof by means of rivets 88 and the operatively lower end is bent away from the inner mounting plate 78 so as to define a space 80 bridged by a third pivot pin 82 for pivotally supporting the inertial latch member 72. This arrangement is most clearly seen in FIG. 3 of the accompanying drawings.

Turning now to FIG. 6, it will be seen that the inertial latch member 72 (shown partly in phantom outline) is adapted by its shape and mass to locate its centre of gravity at a position which will tend to pivot the latch 72 under gravitational forces toward a releasing position in which its detent portion 74 is disengaged from the rearward mounting bar 34. The inertial latch member 72 thus does not interfere with the release of the rearward mounting bar 34 when the bench seat 20 is being intentionally removed from the vehicle, that is, when the vehicle frame is not subject to sudden deceleration.

A second stop means comprising a pin 86 bridges the outer mounting plate 76 and the inner mounting plate 78. It is located above the inertial latch pivot pin 82 so as to arrest gravity induced pivotal movement of the inertial latch member 72 towards the aforementioned releasing position.

In use, the vehicle seat 20 will normally be secured to the vehicle frame as generally illustrated in FIGS. 1 and 2. In order to release the bench seat 20 from the vehicle floor pan 26, the handle portion 64 of the latching assembly 29 is pushed in a clockwise direction to pivot the first jaw member 42 towards the stable unlatched position illustrated in FIG. 4. This permits the corresponding handle of the other latching assembly 28 to be rotated such that the corresponding first jaw member of the latching assembly 28 may be pivoted into a similar stable unlatched position.

The rear of the vehicle seat 20 is then firmly grasped so that it can be pivoted upwardly about the forward mounting bar 32 and the corresponding forward mounting bar on the other side of the vehicle seat 20. This upward motion brings the forwardly facing unlatching cam portion 66 of the second jaw member 44 into engagement with the rearward mounting bar 34, thereby causing the second jaw member 44 to pivot so that its respective detent portion 48 clears the rearward mounting bar 34. At this stage, the detent portion 74 of the inertial latch member 72 also clears the rearward mounting bar under the influence of gravity as described above. Simultaneously, at the upper end of the second jaw member 44, the coil spring 54 is positively displaced to move below the longitudinal axis of the first pivot pin 50. This, with continued upward pivotal movement of the vehicle seat 20, brings the first jaw member 42 from the stable unlatched position illustrated in FIG. 4 to the latchable position illustrated in FIG. 6. It will be understood that the corresponding components of the latching assembly 28 on the other side of the vehicle seat 20 move simultaneously to release that side of the vehicle seat 20 from the associated rearward mounting bar.

Once unlatched in this manner, the vehicle seat 20 is simply moved in a rearward direction, such that the forward mounting bar 32 becomes disengaged from the slot 40 of the latching assembly 29 and the corresponding forward mounting bar on the other side of the bench seat 20 is disengaged from the corresponding slot of the latching assembly 28.

In order to reinstall the vehicle seat 20 in the vehicle, the slot 40 of the latching assembly 29 and the corresponding slot of the latching assembly 28 are aligned with the forward mounting bar 32 and the corresponding forward mounting bar on the other side of the vehicle seat 20, so that the vehicle seat 20 can be slid in a forward direction to engage the forward mounting bars. This position corresponds to the one illustrated in FIG. 6.

It will be appreciated that the latchable configuration shown in FIG. 6 is a stable condition in which the latching assembly remains until acted upon by external forces, such as might be caused by interaction of the jaw members 42, 44 with the rearward mounting bar 34. To complete installation of the vehicle seat 20, the vehicle seat 20 is pivotted downwardly about the forward mounting bars so that the latching cam portions 68 and 70 of the first and second jaw members 42, 44 are brought into engagement with the rearward mounting bar 34. This causes the jaw members 42, 44 to be parted so that the rearward mounting bar 34 can be introduced therebetween. This corresponds to the configuration illustrated in FIG. 5.

It will be appreciated that once the rearward mounting bar 34 is introduced between the jaw members 42, 44, a downwardly facing cam portion 84 of the inertial latch member 72 adjacent the detent portion 74 abuts the rearward mounting bar 34 on its operatively upper face. Further downward movement of the vehicle seat 20 causes the rearward mounting bar 34 to press against the cam portion 84 so that the inertial latch member 72 pivots about the third pivot pin 82 and the detent portion 74 is brought into latching engagement with the rearward mounting bar 34. The jaw members 42, 44, having cleared the rearward mounting bar 34, pivot toward each other under urging of the coil spring 54 and resume the operative latched configuration illustrated in FIG. 2.

It will be understood that numerous variations may be made to the above-described embodiment of the invention without departing from the claimed scope thereof. It will immediately become apparent to one skilled in the art that the forward mounting bar 32 may be secured to the vehicle seat 20 by connecting means of the type similar to the rearward connecting means 41 and that the rearward mounting bar 34 may be engaged by a slot. Moreover, it will be understood that the use of an inertial latch member is entirely optional and that the shape and configuration of cam surfaces may vary as required to fulfill the above-described objectives. Additionally, the latching device of the invention may be advantageously used in association with any other type of vehicle seat other than the "bench" seat illustrated in the Figures, this type of seat being chosen in the preferred embodiment described primarily for ease of illustration.

We claim:

1. A latching assembly for releasably securing a vehicle seat to two generally parallel mounting bars rigidly affixed to a vehicle frame, said assembly comprising:
 a bridge plate rigidly attached to the vehicle seat and dimensioned to span the distance separating a first and second of said two mounting bars; a first connecting means for releasable, securing engagement with the first mounting bar, the first connecting means comprising an open-ended slot formed in the bridge plate for surrounding engagement with the first mounting bar so as to permit pivotal movement of the bridge plate and the attached vehicle seat about said first mounting bar;
 a second connecting means for releasable, securing engagement with the second mounting bar, the second connecting means comprising first and second opposed movable jaw members pivotally mounted on the bridge plate by means of respective first and second pivot pins for independent pivotal movement between a latchable configuration in which said jaw members are adapted to enclose the second mounting bar so as to restrain said pivotal movement of the bridge plate, and an unlatchable configuration in which said jaw members release the second mounting bar, so as to allow said pivotal movement of the bridge plate and the attached vehicle seat and subsequent removal of the vehicle seat; and,
 a biasing means interconning said first and second jaw members, so as to be selectively positionable below the longitudinal axis of said first pivot pin to pivotally bias the first jaw member towards said latchable configuration and so as to be selectively positionable above the axis of said first pivot pin to pivotally bias the first jaw member towards said unlatchable configuration.

2. A latching assembly according to claim 1 further comprising a first stop means fixed to the bridge plate in the path of pivotal movement of said first jaw member so as to arrest pivotal movement of said first jaw member away from said latchable configuration at a stable unlatched position of the first jaw member in which the said biasing means is brought above the axis of said first pivot pin, said first jaw member remaining in the stable unlatched position until said biasing means is returned below said axis.

3. A latching assembly according to claim 2 in which the first jaw member has a handle portion whereby said first jaw member may be manually pivoted from said unlatchable configuration towards said stable unlatched position.

4. A latching assembly according to claim 3 in which the second of said jaw members has an unlatching cam portion positioned adjacent to its respective detent portion which unlatching cam portion is engageable with the second mounting bar upon upward pivotal movement of the vehicle seat about the first mounting bar when the first jaw member has been pivoted to the stable unlatched position such that continued pivotal movement of the seat causes pivotal movement of said second jaw member towards an unlatched position in which said biasing means is positively displaced below said axis of said first pivot pin thereby causing said jaws to release the second mounting bar and to subsequently assume said latchable configuration under urging of said biasing means.

5. A latching assembly according to claim 4 in which said first and second jaw members each have a latching cam portion positioned at one end of said jaw members, said latching cam portions being engageable with the second mounting bar upon downward pivotal movement of the vehicle seat about the first mounting bar when said jaw members are in said latchable configuration such that continued pivotal movement cams said jaw members apart thereby to permit the second mounting bar to be received between the said jaw members for subsequent securing engagement with said second mounting bar under urging of said biasing means.

6. A latching assembly according to claim 5 in which the first mounting bar is a forward mounting bar operatively located at the front of the vehicle relative to the second mounting bar and the second mounting bar is a rearward mounting bar.

7. A latching assembly according to claim 6 in which the slot of the first connecting means is formed in a forward edge of the bridge plate so as to resist forward and upward movement of the vehicle seat.

8. A latching assembly according to claim 7 further comprising an inertial latch member pivotally mounted on the bridge plate and having a detent portion dimensioned to securingly engage the second mounting bar upon sudden deceleration of the vehicle frame so as to prevent pivotal movement of the bridge plate and the vehicle seat.

9. A latching assembly according to claim 8 in which the inertial latch member is mounted to pivot under conditions of constant vehicle velocity toward a releasing position in which its respective detent portion is disengaged from the second mounting bar thereby enabling removal of the vehicle seat when the first and second jaw members are in the unlatchable configuration.

10. A latching assembly according to claim 9 in which the inertial latch member has a cam portion adjacent said detent portion of the inertial latch member which is engageable with the second mounting bar upon downward pivotal movement of the bridge plate and attached vehicle seat about the first mounting bar so as to cam the inertial latch member for pivotal movement towards said securing engagement with the second mounting bar irrespective of deceleration of the vehicle frame.

11. A latching assembly according to claim 10 in which the bridge plate is of bilaminar construction comprising an operatively outer mounting plate on which said first stop means and said first and second pivot pins are mounted on an operatively inner mounting plate between which the inertial latch member is pivotally mounted.

12. A latching assembly according to claim 11 further comprising second stop means bridging the first and second mounting plate above a pivot pin for the inertial latch so as to operatively arrest said constant velocity pivoting of the inertial latch toward a releasing position

* * * * *